Figure 1:
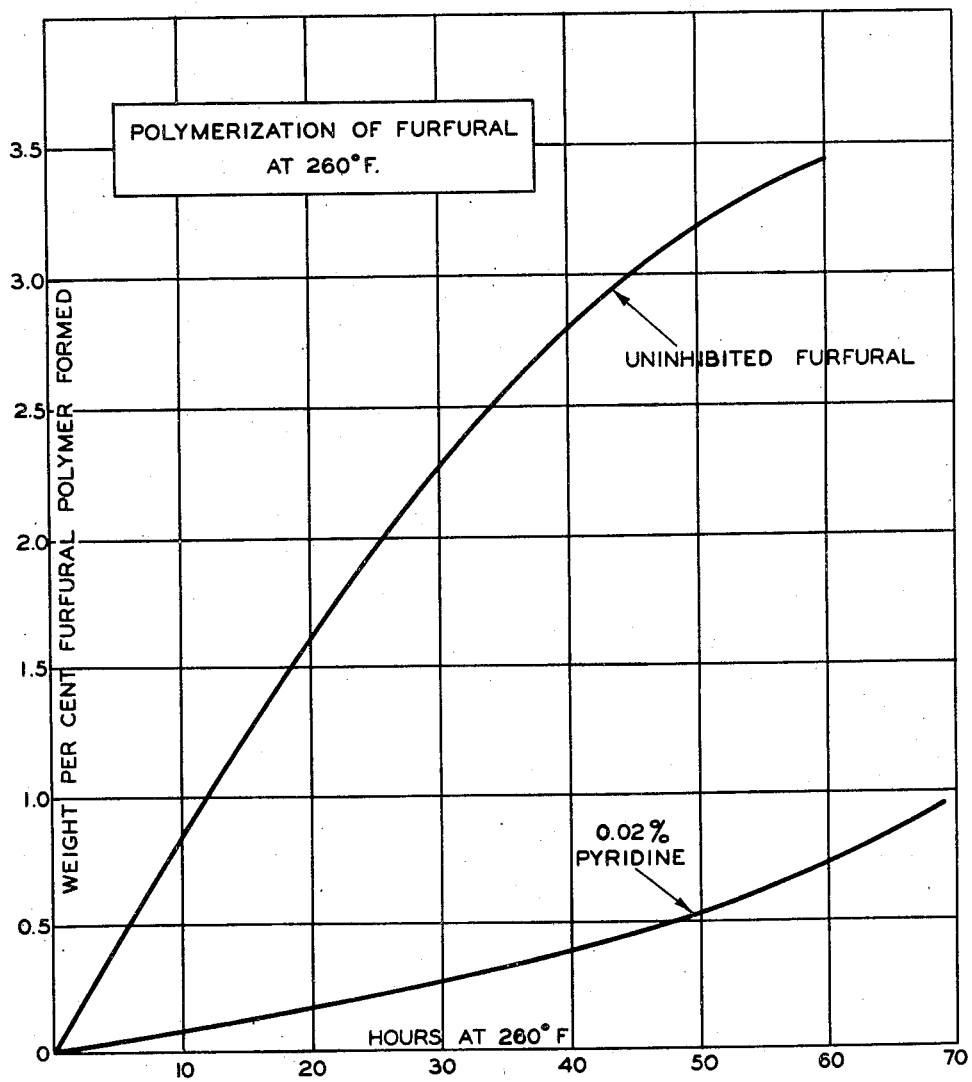

INVENTORS
W. A. SCHULZE
J. C. HILLYER

Patented Oct. 18, 1949

2,485,070

UNITED STATES PATENT OFFICE 2,485,070

INHIBITING POLYMERIZATION OF FURFURAL IN EXTRACTIVE DISTILLATION

Walter A. Schulze and John C. Hillyer, Bartlesville, Okla., assignors to Phillips Petroleum Company, a corporation of Delaware Application March 26, 1945, Serial No. 584,981

16 Claims. (Cl. 202—39.5)

This invention relates to a method for inhibiting polymerization of furfural. More specifically, this invention relates to the addition of selected organic compounds to furfural to inhibit the formation of polymeric materials when said furfural is subjected to elevated temperatures. Still more specifically this invention is concerned with the use of pyridine and its alkyl derivatives as agents for preventing or greatly retarding the formation of high-boiling resins, tars, aldehyde condensation products and other non-volatile substances in furfural solvents as applied to various commercial processes. The present invention is particularly concerned with the problem of furfural polymerization inhibition in those processes wherein furfural is maintained at elevated temperatures over extended periods of time or under conditions conducive to the formation of resinous materials.

Furfural is employed in large quantities in numerous commercial processes. Its use as a selective solvent for the segregation of compounds or groups of compounds, whose volatilities lie so close together that other methods of separation are impractical or inadequate, is well known. In the refining of lubricating oils, for example, undesirable olefinic and diolefinic hydrocarbon constituents may be separated from the paraffinic and naphthenic hydrocarbons through the use of furfural. Similarly, in the refining of natural drying oils employed in paints, various dissimilar fractions which have characteristics superior to the original mixture may be obtained. Furfural is also used as a selective solvent in the refining of resins, especially rosin and rosin derivatives (see Martin U. S. 2,283,156). Furfural has also come into extensive use in extractive distillation processes wherein the volatilities of close-boiling compounds are altered sufficiently to enable separations to be effected satisfactorily in commercial fractionators or super-fractionators. Thus, from $C_4$ hydrocarbon fractions produced in refinery operations such as catalytic or thermal cracking, there may be obtained streams of substantially pure n-butenes, butadiene, and olefin-free normal and isobutane streams. The dehydrogenation of n-butane yields n-butenes which may be separated from the butane by furfural extractive distillation to yield a recycle stream substantially free from unsaturates. Similarly, products resulting from the dehydrogenation of n-butenes may be segregated to give essentially complete recovery of 1,3-butadiene in the state of purity required for the manufacture of synthetic rubber and yield a stream of substantially diolefin-free butenes for recycling to the catalyst. Other applications of the selective action of furfural are numerous. Our invention is applicable to furfural used in these or any other applications where furfural polymerization is encountered.

In the various commercial processes utilizing the selective solvent action of furfural, elevated temperatures are maintained over an extended period as the solvent circulates throughout the system. While furfural is known to darken fairly rapidly when stored at atmospheric temperatures, with the resultant formation of tarry or resinous polymerization products, the formation of said polymeric materials is greatly accelerated as the temperature is increased. In commercial systems the temperature is often maintained at about 200 to 300° F. or higher thereby promoting the formation of tarry products which accumulate in vital parts of the equipment such as valves, pumps, heat exchanger tubes and the like and seriously interfere with flow and operation of the process. In extreme cases polymer formation may occur to such an extent as to block transfer lines. In addition to operational difficulties the selectivity of the solvent is markedly decreased and may render the desired separation unsatisfactory or even impossible.

In order to avoid the operating difficulties inherent in furfural-extraction systems and to maintain the solvent selectivity at a high level, it has heretofore been necessary to provide facilities for the removal of polymeric materials. Polymer removal has been accomplished by installing means for periodic distillation of the solvent or a continuous distillation system has been provided whereby a sufficient portion of the circulating stream is distilled at such a rate as to keep the polymer content below a certain level. Methods now in use for purifying furfural used in recovery of butene and butadiene from $C_4$ hydrocarbon streams are described in detail in the copending application of Hachmuth, Ser. No. 460,874, now U. S. Patent 2,372,668 and in U. S. Pats. to Buell et al., 2,350,584 and Hachmuth, 2,350,609, to which attention should be directed for further background. The methods hitherto proposed accomplish satisfactory elimination of the polymer, but at the same time there is entailed an appreciable loss in the volume of solvent. The cost of replacing the solvent often becomes a major factor in the total operating cost and may be sufficient to render the process commercially unattractive. While certain operating difficulties may account for losses in the furfural, it has been found that the formation of heavy polymer is responsible for the major portion of the loss. Complete or partial elimination of polymer formation is highly desirable and the accomplishment of this objective would constitute a valuable advance in the art of furfural extraction processes.

Our invention is particularly applicable to furfural used as the solvent in the extractive distillation of aliphatic hydrocarbon streams to recover unsaturated hydrocarbons therefrom such as olefins and/or diolefins, for example, normal butene and/or butadiene from C4 hydrocarbon streams, this being the principal if not the only present commercial application of extractive distillation with furfural as a means of recovering unsaturated hydrocarbons. However, our invention may be applied wherever furfural is used as the solvent in the recovery by extractive distillation of other aliphatic olefins or aliphatic conjugated diolefins from hydrocarbon streams containing the same.

In extractive distillation, solvent extraction is combined with continuous fractional distillation, the furfural being supplied continuously to the top of the column and descending therein and the hydrocarbon feed being supplied to an intermediate point in the column and being vaporized upwardly countercurrently to the furfural, there being provided the usual bubble trays or packing, a reboiler at the bottom of the column and means for condensing overhead vapors and returning condensate as reflux to the top of the column. The separation of butadiene in this manner is described in copending applications of Hachmuth, Ser. No. 454,312, filed August 10, 1942, now U. S. Patent 2,415,006 and Ser. No. 438,844, filed April 13, 1942, now U. S. Patent 2,434,796. The latter patent also discloses the separation of normal butene from normal butane and is directed to the use of a solvent consisting of furfural containing dissolved water in amount ranging from 1% up to saturation which substantially lowers the boiling temperature of the furfural. The temperature at the bottom of the extractive distillation column is the boiling point of the liquid at that point under the operating pressure of the column. The operating pressure is sufficiently high to permit condensation of a portion of the overhead vapors for reflux. The liquid in the bottom of the absorption column is composed of furfural having dissolved therein water and the selectively absorbed hydrocarbon. This bottoms liquid is withdrawn and introduced into another column at a point near the top. In this second column the dissolved unsaturated hydrocarbons are stripped out of the top and the lean furfural bottom liquid is cooled and returned to the absorption column. The stripper column is provided with a reboiler at its bottom and means for refluxing with condensed overhead. The temperature at the bottom of the stripping column is the boiling point of the liquid at that point under the column operating pressure. Ordinarily the furfural absorber and stripper are operated with bottom temperatures of 300–325° F. and under pressures of 50–65 pounds per square inch gauge. In the furfural re-run unit which operates continuously on a sidestream of the lean furfural, temperatures of 200–300° F. and pressures ranging from atmospheric to 40 pounds per square inch gauge are commonly maintained. Thus, it will be seen that the furfural is continuously being subjected to repeated vaporization at relatively high temperatures. The combined influence of heat, pressure, iron and iron salts, acids, moisture and hydrocarbons, especially olefins or diolefins, and other factors as yet but little understood, brings about the polymerization of the furfural. Due to the scarcity and high cost of furfural the loss in this manner has been a most serious problem. This problem is made more serious because the best available information to date indicates that the polymerization of furfural is auto-catalytic.

It is an object of the present invention to provide a method of inhibiting the formation of high-boiling resins, tars and other non-volatile materials in furfural.

It is also an object of the invention to provide a means for reducing the accumulation of polymer or heavy tar deposits in furfural extractive distillation systems operated at elevated temperatures, especially in the recovery of aliphatic unsaturated hydrocarbons such as normal butene and/or butadiene.

It is a further object to maintain the furfural in a high state of selectivity in extractive distillation systems while simultaneously preventing or reducing polymer formation in said systems.

It is a still further object to reduce the formation of polymeric materials in furfural through the addition of inhibitors selected from the group comprising pyridine and its alkyl homologs.

The accompanying drawings portray graphically the inhibition of furfural polymerization by means of pyridine in a specific embodiment of the present invention, as determined by actual laboratory tests.

Heretofore no practical process for reducing or retarding the rate of polymer formation in furfural has been advanced. The addition of small quantities of antioxidants, particularly pyrogallol, has been proposed but this expedient has not been found to give satisfactory results in commercial operations. While it is known that oxygen promotes resin formation in furfural, oxygen-containing gases are excluded from substantially all commercial units. Antioxidants, therefore, exert no protective function against resin formation which proceeds rapidly at elevated temperatures in systems from which oxygen is excluded. In fact, conventional anti-oxidants such as phenols and amino compounds are known to react with furfural at elevated temperatures, to form non-volatile products, thus accounting for appreciable solvent loss as well as accumulation of large quantities of solid materials.

We have found that the formation of heavy polymers, tars, resins and the like in furfural can be greatly retarded by the addition of small quantities of a compound selected from the group of heterocyclic nitrogen bases consisting of pyridine and its alkyl homologs. The preferred inhibitors of the present invention are pyridine and its mono-methyl homologs (the picolines), although other alkyl derivatives such as the lutidines ($C_7H_9N$), collidines ($C_8H_{11}N$), parvolines ($C_9H_{13}N$), etc., are included within the scope of the disclosure.

Typical inhibitors which may be used in accordance with the present invention are:

| Compound | B. P., ° C. |
| --- | --- |
| Pyridine | 115 |
| 2-Methyl Pyridine | 129 |
| 3-Methyl Pyridine | 143 |
| 4-Methyl Pyridine | 143 |
| 2,4-Dimethyl Pyridine | 157 |
| 2,5-Dimethyl Pyridine | 156 |
| 2,6-Dimethyl Pyridine | 142 |
| 3,4-Dimethyl Pyridine | 163 |
| 2-Ethyl Pyridine | 149 |
| 3-Ethyl Pyridine | 165 |
| 4-Ethyl Pyridine | 166 |
| 2-Methyl-4-Ethyl Pyridine | 178 |
| 4-Methyl-3-Ethyl Pyridine | 195 |
| 2,4,6-Trimethyl Pyridine | 171 |
| 2,4-Diethyl Pyridine | 188 |
| 3,4-Diethyl Pyridine | 209 at 710 mm. |

Instead of the pure pyridine or alkyl pyridine we may use mixtures of alkyl pyridines both isomeric and non-isomeric, or mixtures of one or more alkyl pyridines with pyridine. We may use commercial pyridine or alkyl pyridines. We may use mixtures of pyridine and alkyl pyridines or of alkyl pyridines available commercially either now or in the future either synthetic or naturally occurring such as certain pyridine and/or alkyl pyridine fractions recovered from coke oven gases, coal tar, bone oil, shale oil, etc. The inhibitor compound or mixture may be contaminated with other materials which are not harmful and which may actually possess an inhibiting action such as quinoline and its alkyl homologs. The use of quinoline and its alkyl homologs as furfural inhibitor is disclosed and claimed in the copending joint application of applicant Hillyer and D. A. Nicewander, Ser. No. 584,984, filed March 26, 1945, now U. S. Patent 2,440,442. Particular care should be taken that any pyridine and/or alkyl pyridine material used in carrying out the present invention be free from piperidine, isoquinoline, morpholine and aliphatic and aromatic amines since these compounds are very unsatisfactory because they react with furfural and/or catalyze the formation of polymer.

While pyridine is very effective as a polymerization inhibitor for furfural it possesses the disadvantage that its boiling point differs appreciably from that of furfural and therefore in any operating system some separation of the two is likely. The pyridine might thus be lost in a continuous rerunning operation or become concentrated in certain parts of the operating system while at other points little inhibitor would be present. An inhibitor of more nearly the same boiling point as furfural is desirable. Alpha-methyl pyridine (2-methyl pyridine or $\alpha$-picoline) boils at 129° C. compared with 162° C. for dry furfural and appears more suitable than pyridine under such circumstances. Where dissolved water is present in the furfural, as is usually the case in commercial installations, the pyridine or alkyl pyridine and furfural may have their volatilities changed by the water due to the tendency to form azeotropes of the minimum-boiling type but this is advantageous since for example, in the case of pyridine, its azeotrope with water boils at 92.6° C. or only about 5 degrees centigrade below the boiling point of the azeotrope of furfural with water whereas dry pyridine boils at 115° C. or 37 degrees centigrade below dry furfural. The present invention is particularly applicable to furfural containing dissolved water in amount ranging from 1% up to saturation.

The addition of the inhibitor to the furfural stream may be effected by any suitable means. Generally it will be most convenient to add it to the circulating solvent stream, but any other method suitable to the system at hand may be adopted.

The quantity of inhibitor required depends upon the rate of polymerization of the solvent in the system under consideration. Among the factors affecting the rate of polymerization may be mentioned the temperature, the time during which a given sample of furfural is subjected to elevated temperatures, the presence of certain heavy metals such as iron, copper, tin and lead and their salts, and the presence of other substances such as water, oxygen, tars, gums and the like. The polymer itself has been shown to exert an accelerating effect on the rate of polymerization. Free mineral acids, particularly hydrochloric acid, even when present in minute quantities, also have a pronounced accelerating effect on the polymerization rate. Among the metal salts which may be present in the furfural stream, iron salts, particularly ferric chloride, are especially active in promoting the formation of resinous materials. Since variations in these factors will be found in different systems employing furfural, it is obvious that the individual cases must be studied in order to determine the amount of inhibitor necessary to effect the desired results. The optimum quantity of inhibitor is best determined experimentally by making tests on small samples withdrawn from the system. In general, the amount of inhibitor may vary from about 0.01 to about 0.5 weight per cent of the furfural although in special cases quantities ranging as high as 1.0 per cent may be used.

The concentration of inhibitor maintained throughout the stream is an important factor in the satisfactory operation of the present invention. Generally either continuous or intermittent addition of a small quantity of fresh inhibitor is required in order that the desired concentration is realized. Gradual loss of inhibitor results from reaction with various materials in the system and from mechanical loss, particularly that occurring in systems utilizing a redistillation process to effect elimination of the heavy polymer from the solvent. In certain systems, especially those employing steam distillation, the aqueous layer and any relatively low-boiling materials are frequently discarded and, in cases where pyridine and its mono-methyl derivatives (the picolines) are employed, some loss will necessarily be sustained since these compounds possess somewhat lower boiling points than furfural. Generally it will be found desirable to provide means to recover the inhibitor which is removed in these light ends. Where the inhibitor goes overhead in small amount from the absorber or the stripper of the extractive distillation system, it may be returned to the system by refluxing the water layer separating in the overhead condensate. Where the inhibitor goes overhead in the furfural rerun unit, it may be retained in the system by recycling the water layer to the rerun unit as a source of steam therefor. The amount of inhibitor present must not be allowed to exceed the maximum value determined for any particular case. In general, amounts of 0.5 to 1.0 per cent and above are to be avoided since increasingly large amounts of these compounds appear to promote rather than to retard the rate of polymer formation. At elevated temperatures it is possible that the inhibitor reacts with the furfural although no evidence of such activity is observed when the concentration is maintained within the preferred limits of our invention.

According to the process of our invention the addition of pyridine and its alkyl derivatives will generally effect a reduction in the polymerization rate of furfural from 25 to 80 or 90 per cent and in some cases substantially complete reduction is accomplished. The small quantities of polymer which gradually accumulate are then removed by any suitable means such as continuous redistillation. Through the use of our inhibitors the replacement costs of the solvent are kept at a minimum and the operating expense attendant in the redistillation process becomes of minor importance.

Fig. 1 of the accompanying drawings portrays the results of a laboratory study of the action of pyridine in inhibiting polymerization of furfural which had been accelerated with iron as ferric chloride and hydrogen chloride. To a lot of pure steam distilled furfural there was added 0.01 per cent of concentrated hydrochloric acid (giving a concentration of 0.0036 per cent of hydrogen chloride) and 0.03 per cent of ferric chloride in order to accelerate polymerization of the furfural. To one set of samples of the accelerated furfural was added 0.02 per cent by weight of pyridine as a polymerization inhibitor. Another set of uninhibited samples of accelerated furfural was prepared for purposes of comparison. The two sets of samples were placed in sealed tubes and subjected to heating at 260° F. for varying periods, the quantity of polymer formed being determined and plotted as shown. Direct comparison between the rate of polymerization for the inhibited and the uninhibited furfural was thus made possible. The graph shows the great reduction in polymerization rate brought about by the use of pyridine. The action of pyridine on unaccelerated furfural is striking but is not so great. The addition of accelerators, ferric chloride and hydrogen chloride, represents an attempt to simulate plant conditions in the laboratory. Uninhibited pure furfural does not polymerize nearly so rapidly as uninhibited plant furfural such as furfural from an extractive distillation system. It is known that the plant furfural contains iron salts and substantial acidity and it has been found possible in the laboratory to approximate the effect of these by the addition of ferric chloride and hydrochloric acid to pure steam distilled furfural.

Figure 2:
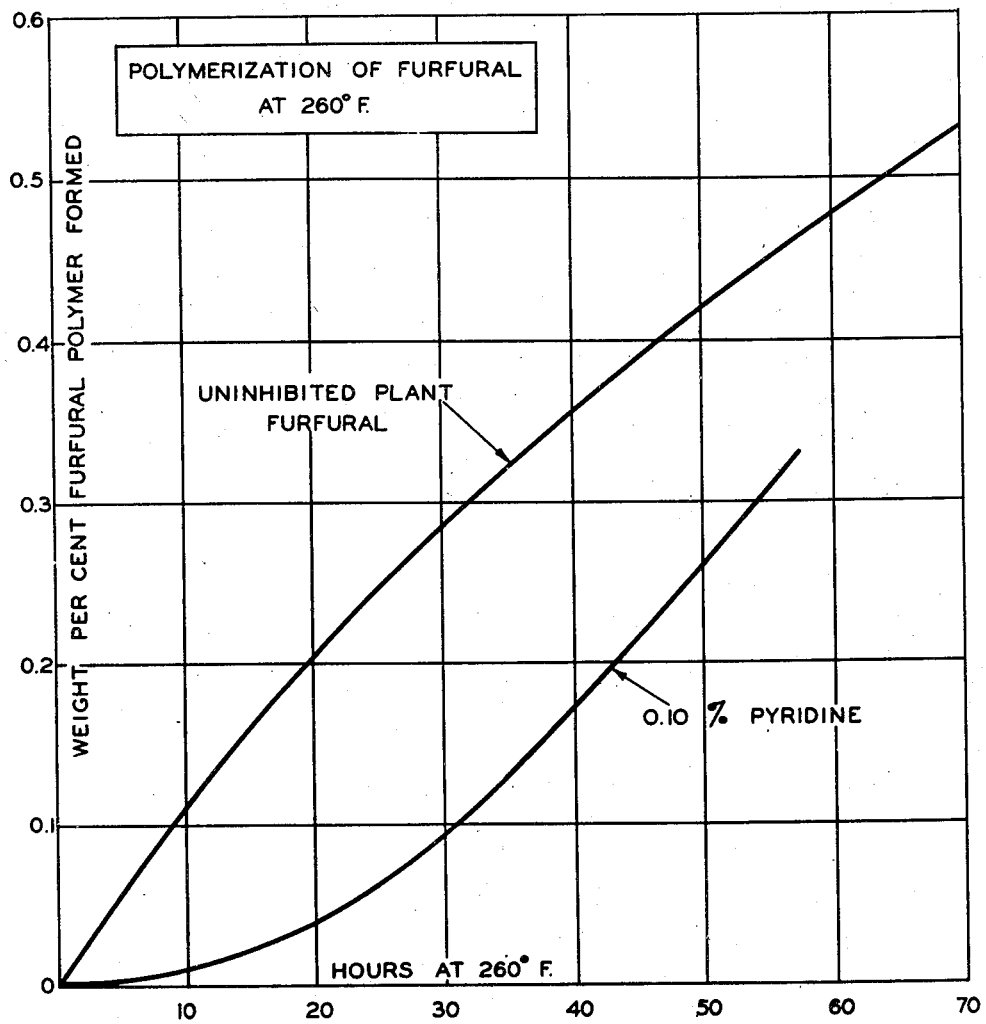

Fig. 2 of the drawings shows similar comparative results on the inhibition of polymerization of unaccelerated furfural obtained from the circulating furfural stream in an extractive distillation system used in the recovery of normal butene and butadiene from C4 streams containing the same. In this case 0.1 per cent by weight of pyridine was used as the inhibitor and several samples were tested using different times and the same laboratory technique as described above in connection with Fig. 1.

The following examples are offered as further illustration of the nature of this invention; however, no limitations are to be implied except as hereinafter imposed by the claims. The parts are by weight.

*Example I*

In order to determine the effect of pyridine as an inhibitor of furfural polymerization, 0.05 part of pyridine was added to 100 parts of a furfural sample, obtained from the circulating stream in a commercial unit employing this solvent for the separation of butanes, butenes and butadiene. Portions of this mixture were placed in a series of glass tubes, the air was replaced by nitrogen and the tubes sealed and immersed in an oil bath where the temperature was maintained at 260° F. At intervals tubes were removed, cooled to 32° F., opened and the non-volatile polymer determined by a rapid vacuum distillation method carried out under carefully controlled conditions. The method comprises the rapid distillation of substantially all the furfural at temperatures not to exceed 212° F., the removal of traces of volatile matter by suitable means and weighing of the residue. The rate of polymer formation was established by comparison of the tarry, non-volatile residue formed with that present in a sample of the furfural-pyridine mixture immediately after its preparation. The tabulation which follows shows the polymer formed in pyridine-inhibited samples as contrasted with the polymerization rate under the same conditions in the absence of an inhibitor. The furfural samples contained approximately 5.0 per cent water.

| Hours at 260° F. | Furfural+Pyridine, Per Cent Polymer Formed | | Furfural Alone, Per Cent Polymer Formed | |
|---|---|---|---|---|
| | Net Total | Rate Per Day | Net Total | Rate Per Day |
| 1 | 0.09 | 0.11 | 0.20 | 0.24 |
| 46 | 0.16 | 0.08 | 0.40 | 0.21 |

Thus the reduction in polymerization rate achieved through the use of pyridine was 62 per cent.

*Example II*

To 100 parts of a furfural sample, obtained as in Example I, was added 0.1 part of pyridine and the mixture was placed in sealed glass tubes. The procedure of Example I was followed except that the temperature was held at the level of 290° F. Polymerization was allowed to proceed over a 24-hour period during which time tubes were removed at intervals and the nonvolatile residue determined in the usual way by the rapid vacuum distillation method. The inhibited sample polymerized at the average rate of 0.17 weight per cent of the furfural per day while an uninhibited sample treated in the same manner revealed the normal rate of polymerization to be 0.31 per cent. A 45 per cent reduction was, therefore, realized by the use of pyridine as an inhibitor.

*Example III*

To 100 parts of a freshly distilled furfural sample which contained 0.0036 per cent by weight of hydrogen chloride were added 5.0 parts of water and 0.1 part of pyridine. A series of sealed glass tubes containing portions of the mixture was prepared as in Example I and the polymerization allowed to proceed at a temperature of 260° F. for a 60-hour period. During this interval tubes were withdrawn and the polymer determined. The average daily polymerization rate was 0.25 weight per cent of the furfural. In contrast to the result obtained with the inhibited sample was a value of 1.70 per cent which represented the normal polymerization rate of the uninhibited sample of hydrogen chloride-containing furfural. These values show an 85 per cent reduction in the rate of polymer formation effected by the addition of the inhibitor.

*Example IV*

The effect of pyridine on a sample of freshly distilled furfural containing both hydrogen chloride and ferric chloride was studied. To 100 parts of furfural containing 0.0036 weight per cent hydrogen chloride and 0.03 weight per cent ferric chloride was added 0.025 part of pyridine. The procedure of Example I was followed and the temperature was maintained at 260° F. A parallel determination was made on an identical sample without the use of the inhibitor. Polymer formation occurred at the rate of 0.28 weight per cent of the furfural per day in the inhibited sample while a value of 1.38 per cent resulted in the sample without the inhibitor. The pyridine reduced the polymerization rate to 80 per cent of the rate of the uninhibited sample.

*Example V*

A sample of furfural removed from the circulating stream in an extractive distillation plant employing this solvent for the separation of butanes, butenes and butadiene contained 5.0 per cent by weight of water and 0.1 per cent of C₄ hydrocarbons. The effect of 2-methyl pyridine as a polymerization inhibitor on this furfural was determined by the addition of 0.10 part of the alkyl pyridine to 100 parts of the furfural followed by testing the mixture, which was allowed to polymerize at 260° F. in sealed tubes, according to the procedure described in Example I. In 46-hour tests a polymerization rate of 0.12 weight per cent of the furfural per day was noted when the inhibitor was present but in the absence of the inhibitor the higher rate of 0.21 per cent was observed. The 2-methyl pyridine, therefore, effected a reduction of 43 per cent in the polymerization rate.

Example VI 2-methyl pyridine, 0.1 part and 5.0 parts of water were added to 100 parts of freshly distilled furfural which contained 0.03 per cent of ferric chloride. The average polymerization rate after 60-hour tests in sealed glass tubes at 260° F. was found to be 0.25 weight per cent of the furfural per day. A parallel test made on the furfural-water-ferric chloride mixture without the addition of the 2-methyl pyridine showed that the normal polymerization rate of this sample was 0.95 weight per cent per day. The decrease in the rate of polymerization accomplished through the use of 2-methyl pyridine as an inhibitor was 74 per cent.

Example VII

In the manufacture of butadiene by two-stage dehydrogenation of normal butane, a recovery system embodying a normal butene absorber between stages and a 2-butene-butadiene absorber after the second stage was employed. The furfural-water mixture was fed continuously into absorbers at a total rate of 260,000 gal./hr. The circulating water-furfural mixture contained 6 weight per cent water. After removal of the hydrocarbon in the strippers associated with the respective absorbers, the lean furfural-water mixture was cooled to 120–130° F. and the major part of the cooled lean solvent was passed to the furfural surge tank. A side stream of lean furfural of suitable quantity was withdrawn and fed to a furfural rerun unit. The total volume of furfural in the entire system was 225,000 gallons. Under these conditions, operations were unsatisfactory because severe corrosion occured and a considerable quantity of furfural was lost as polymer.

At this time, the addition of pyridine to the circulating furfural-water mixture was begun. It was added at the rate of 20 lb./hr. until the concentration of 0.10 weight per cent pyridine was reached. The rate of pyridine addition was then reduced to a quantity sufficient to maintain the 0.1 weight per cent concentration in the solvent. This caused a marked reduction in the acidity and polymer content of the furfural and consequently required a considerably smaller quantity to be rerun in order to maintain a predetermined polymer concentration in the circulating solvent stream. The formation of polymer was reduced approximately 50% by the use of pyridine in accordance with this example.

We claim:

1. A process which comprises subjecting a mixture of organic compounds, capable of being segregated into dissimilar fractions by furfural, to selective solvent extraction with furfural containing not more than 1 per cent by weight of a furfural polymerization inhibiting compound selected from the group consisting of pyridine and its alkyl homologues, at temperatures elevated above atmospheric and under non-oxidizing conditions.

2. A process which comprises subjecting a mixture of organic compounds, capable of being segregated into dissimilar fractions by furfural, to selective solvent extraction with furfural containing from 0.01 to 0.5 per cent by weight of a furfural polymerization inhibiting compound selected from the group consisting of pyridine and its alkyl homologues, at temperatures elevated above atmospheric and under non-oxidizing conditions.

3. A process which comprises subjecting a mixture of organic compounds, capable of being segregated into dissimilar fractions by furfural, to selective solvent extraction with furfural containing not more than 1 per cent by weight of pyridine as a furfural polymerization inhibitor, at temperatures elevated above atmospheric and under non-oxidizing conditions.

4. The process of claim 1 wherein said compound is a picoline.

5. The process of claim 1 wherein said compound is a lutidine.

6. The process of claim 1 wherein said compound is 2-methyl pyridine.

7. The process of claim 1 wherein said selective solvent extraction is effected in the presence of furfural polymerization accelerating materials.

8. A process which comprises subjecting a mixture of organic compounds, capable of being segregated into dissimilar fractions by furfural, to selective solvent extraction with furfural containing not more than 1 per cent by weight of a furfural polymerization inhibiting compound selected from the group consisting of pyridine and its alkyl homologues, at an elevated temperature of at least 200° F. and under non-oxidizing conditions.

9. A process which comprises subjecting a hydrocarbon mixture containing unsaturated hydrocarbons selectively soluble in furfural to extractive distillation at an elevated temperature of at least 200°F. under non-oxidizing conditions with furfural containing not more than 1 per cent by weight of a furfural polymerization inhibiting compound selected from the group consisting of pyridine and its alkyl homologues.

10. A process which comprises subjecting an aliphatic C₄ hydrocarbon mixture containing at least one unsaturated hydrocarbon selected from the group consisting of normal butene and butadiene to extractive distillation at an elevated temperature within the limits of 200–325°F. under non-oxidizing conditions with furfural containing dissolved water in amount ranging from one per cent up to saturation and also containing not more than 1 per cent by weight of a compound selected from the group consisting of pyridine and its alkyl homologues, thereby separating the less-saturated from the more-saturated C₄ hydrocarbons while minimizing polymerization of furfural occurring during the said extractive distillation.

11. A process which comprises subjecting a hydrocarbon mixture containing unsaturated hydrocarbons selectively soluble in furfural to extractive distillation at an elevated temperature of at least 200°F. under non-oxidizing conditions with furfural containing from 0.01 to 0.5 per cent by weight of a furfural polymerization inhibiting compound selected from the group consisting of pyridine and its alkyl homologues.

12. A process which comprises subjecting an aliphatic C4 hydrocarbon mixture containing at least one unsaturated hydrocarbon selected from the group consisting of normal butene and butadiene to extractive distillation at a temperature within the limits of 200 to 325° F. under non-oxidizing conditions with furfural containing dissolved water in amount ranging from one per cent up to saturation and also containing from 0.01 to 0.5 per cent by weight of a compound selected from the group consisting of pyridine and its alkyl homologues, thereby separating the less-saturated from the more-saturated C4 hydrocarbons while minimizing polymerization of furfural during the said extractive distillation.

13. The process of claim 8 wherein said compound is a picoline.

14. The process of claim 8 wherein said compound is a lutidine.

15. The process of claim 8 wherein said compound is 2-methyl pyridine.

16. The process of claim 8 wherein said selective solvent extraction is effected in the presence of furfural polymerization accelerating materials.

WALTER A. SCHULZE.
JOHN C. HILLYER.

REFERENCES CITED

The following references are of record in the file of this patent:

UNITED STATES PATENTS

| Number | Name | Date |
|---|---|---|
| 2,241,175 | Barnes | May 6, 1941 |
| 2,267,309 | Senkus | Dec. 23, 1941 |
| 2,382,207 | Comstock | Aug. 14, 1945 |
| 2,384,238 | Comstock | Sept. 4, 1945 |
| 2,388,041 | Craig | Oct. 30, 1945 |
| 2,404,253 | Scarth | July 16, 1946 |
| 2,407,861 | Wolk | Sept. 17, 1946 |
| 2,409,781 | Mertz | Oct. 22, 1946 |

OTHER REFERENCES

Autooxidation and Antioxygenic Action, by Mourea et al. in Compt. rend., volume 183, pages 408 to 412; translation by Maurer in 260–666.5; 7 pages.